US012220088B2

(12) United States Patent
Nathan et al.

(10) Patent No.: US 12,220,088 B2
(45) Date of Patent: Feb. 11, 2025

(54) CULINARY CONTAINER STORAGE DEVICE

(71) Applicant: Caraway Home, Inc., New York, NY (US)

(72) Inventors: Jordan Nathan, New York, NY (US); Bret Recor, San Francisco, CA (US); Kenneth Young, San Francisco, CA (US); Benjamin Gross, San Francisco, CA (US); Virosh Rangalla, San Francisco, CA (US); Christoph Andrejcic, San Francisco, CA (US)

(73) Assignee: Caraway Home, Inc., New York, NY (US)

( * ) Notice: Subject to any disclaimer, the term of this patent is extended or adjusted under 35 U.S.C. 154(b) by 0 days.

(21) Appl. No.: 18/487,120

(22) Filed: Oct. 16, 2023

(65) Prior Publication Data

US 2024/0130572 A1 Apr. 25, 2024
US 2024/0225371 A9 Jul. 11, 2024

Related U.S. Application Data

(60) Provisional application No. 63/417,985, filed on Oct. 20, 2022.

(51) Int. Cl.
*A47J 47/16* (2006.01)

(52) U.S. Cl.
CPC ..................... *A47J 47/16* (2013.01)

(58) Field of Classification Search
CPC ........... A47J 47/16; A47J 47/20; A47B 65/00; A47B 65/20; A47B 65/15; A47B 81/04;
(Continued)

(56) References Cited

U.S. PATENT DOCUMENTS

D104,956 S * 6/1937 Baker .......................... D6/683.1
3,391,793 A * 7/1968 Streuli ................... A47B 65/00
211/43
(Continued)

FOREIGN PATENT DOCUMENTS

CA 3217069 A1 * 4/2024 .............. A47J 47/16
CN 109330222 A 2/2019
(Continued)

OTHER PUBLICATIONS

Extended European Search Report of the European Patent Office in related European Patent Appl. No. 23204605.2, dated Feb. 19, 2024, 10 pages.

*Primary Examiner* — Jennifer E. Novosad
(74) *Attorney, Agent, or Firm* — Bochner PLLC; Andrew D. Bochner; Eric R Kleinertz

(57) ABSTRACT

A device may include a left wall, a right wall, a bottom wall, and a rear wall, wherein the left wall is disposed orthogonal to the rear wall, wherein the right wall is disposed orthogonal to the rear wall, wherein the rear wall is disposed orthogonal to the bottom wall, wherein the left wall is disposed orthogonal to the bottom wall, and wherein the right wall is disposed orthogonal to the bottom wall. A device may include a divider in contact with the rear wall and the bottom wall, the divider disposed in parallel to the left wall and the right wall. A device may include a left pocket and a right pocket. A device may include one or more magnet wells disposed in each of the left wall and the right wall, the one or more magnet wells sized to accept one or more magnets.

11 Claims, 15 Drawing Sheets

(58) Field of Classification Search
CPC ..... A47B 47/0091; A47B 77/14; A47L 14/04; Y10S 211/01
USPC .......... 211/41.11, 10, 11, 42, 43, DIG. 1, 40
See application file for complete search history.

(56) References Cited

U.S. PATENT DOCUMENTS

| | | | | |
|---|---|---|---|---|
| 3,592,344 A * | 7/1971 | Schade | ................... | B42F 7/145 229/164 |
| 3,737,046 A * | 6/1973 | Jeter | ................... | B42F 17/08 211/10 |
| 3,759,395 A * | 9/1973 | Juhlin | ................... | A47B 63/00 211/11 |
| 3,827,570 A * | 8/1974 | Betts | ................... | B42F 17/02 206/561 |
| 3,870,156 A * | 3/1975 | O'Neill | ................... | A47B 87/0207 211/11 |
| 3,905,484 A * | 9/1975 | Dean | ................... | A47B 57/58 211/184 |
| 4,494,658 A * | 1/1985 | Simon | ................... | G09F 23/06 211/49.1 |
| D279,245 S * | 6/1985 | Wohlman | ................... | D6/682.4 |
| 4,595,105 A * | 6/1986 | Gold | ................... | A47B 47/00 211/184 |
| D299,657 S * | 1/1989 | Hwang | ................... | D19/75 |
| 4,909,398 A * | 3/1990 | Santucci | ................... | A47F 7/147 211/11 |
| 4,949,853 A * | 8/1990 | Klein | ................... | A47B 47/02 211/186 |
| 5,121,681 A * | 6/1992 | Chang | ................... | A47B 65/10 108/65 |
| 5,207,334 A * | 5/1993 | Lear | ................... | A47J 47/16 211/89.01 |
| D335,976 S * | 6/1993 | Brown | ................... | D3/319 |
| 5,462,299 A * | 10/1995 | Maddux | ................... | A47B 31/00 211/49.1 |
| D422,436 S * | 4/2000 | Fisher | ................... | D6/683.1 |
| D438,728 S * | 3/2001 | Fisher | ................... | D6/678.3 |
| 7,571,823 B2 * | 8/2009 | Richardson | ................... | A47F 5/00 211/183 |
| D646,722 S * | 10/2011 | Chuang | ................... | D19/90 |
| 10,945,563 B2 * | 3/2021 | Singh | ................... | A47J 47/16 |
| 11,064,841 B2 * | 7/2021 | Nathan | ................... | A47B 81/04 |
| D939,286 S * | 12/2021 | Nathan | ................... | D7/601 |
| 11,261,006 B2 * | 3/2022 | Kennedy | ................... | B65D 43/16 |
| 11,445,822 B1 * | 9/2022 | Werner | ................... | A47B 81/005 |
| 11,484,119 B1 * | 11/2022 | Yang | ................... | F41A 23/18 |
| D993,717 S * | 8/2023 | Nathan | ................... | D7/601 |
| 2005/0279725 A1 * | 12/2005 | Sheldon | ................... | A47J 47/16 211/175 |
| 2016/0166117 A1 * | 6/2016 | Oduguwa | ................... | A47G 21/14 206/553 |
| 2021/0100403 A1 * | 4/2021 | Nathan | ................... | A47J 47/16 |
| 2022/0402653 A1 * | 12/2022 | Nathan | ................... | A47J 47/16 |
| 2024/0130572 A1 * | 4/2024 | Nathan | ................... | A47J 47/16 |

FOREIGN PATENT DOCUMENTS

| | | | | |
|---|---|---|---|---|
| CN | 111493709 A | | 8/2020 | |
| CN | 117917221 A | * | 4/2024 | ............. A47J 47/16 |
| KR | 20090007271 U | | 7/2009 | |
| WO | WO-2021071817 A1 | * | 4/2021 | ............. A47B 81/04 |

* cited by examiner

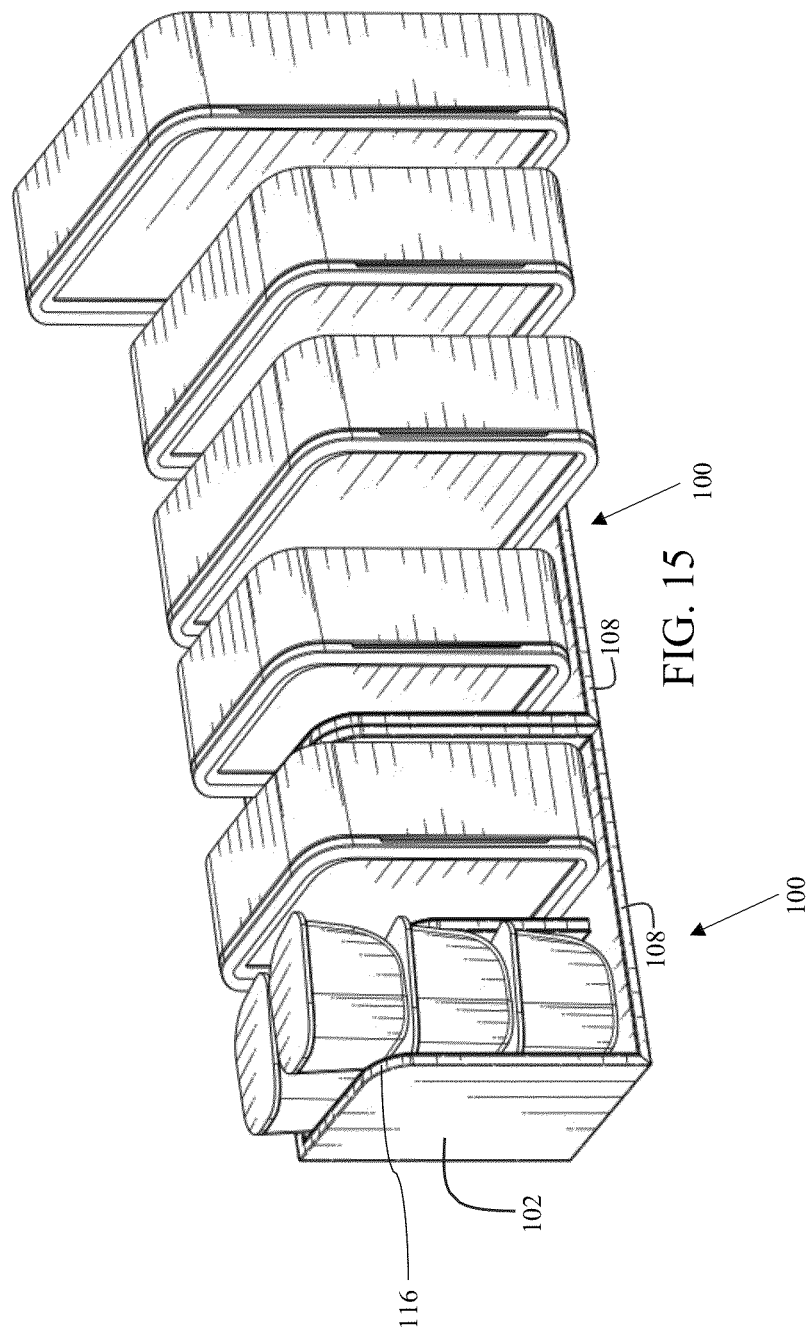

CULINARY CONTAINER STORAGE DEVICE

FIELD OF INVENTION

The present disclosure is in the field of culinary storage devices. More specifically, the present disclosure relates to culinary storage devices configured for use with culinary containers.

INTRODUCTION

Modern day kitchens often include numerous containers used for both food storage and preparation. Today, many individuals pre-prepare meals for consumption throughout the week or sort non-perishables in such containers. Accordingly, kitchens include containers of various shapes and sizes, resulting in a need to store such containers.

Due to the constant use of culinary containers, the varied layouts of kitchens in different homes, and the need for accessible and convenient containers, a multitude of container storage systems have been attempted.

Traditional container storage systems attempt to store containers to reduce the footprint and space needed. This is particularly beneficial in scenarios where kitchen space is limited, such as apartments in urban settings. However, even with reduced footprints, traditional container storage systems are seldom efficient, as a result of manufacturing variations in shape and size. Essentially, there is great difficulty in organizing culinary containers, as said containers are oftentimes incongruent and fail to nest easily. Moreover, considering many of these containers are sized for specific uses, simply reshaping the pieces to be more stackable is impractical.

Additionally, durability and reliability, in conjunction with efficiency and ease-of-use, have proven to be a long-standing issue in container storage. For example, cabinet and drawer spaces do not resolve the problem of storage efficiency, due to the haphazard stacking and incongruous shape of many containers. Further, due to the curvature of many containers' sidewalls, standing said containers on their side is impracticable.

Stacking containers does not solve storage dilemmas for users, in fact, stacking containers may create larger problems. For example, in a multi-piece container stack, if a user wants a piece from the bottom, the user must pull all the containers out of the cabinet, and remove said pieces in order to retrieve the desired container. Since container shapes have very particular sizes, the sizes for each type of shape in the market creates a situation where containers from different manufacturers are unable to be stacked upon one another, thus, creating further organizational issues. Moreover, the pieces at the top of a stack are likely to fall or force users to expend more cabinet space to accommodate them. In turn, users will typically opt for space-wasting options that easily stack at the expense of ease of access. Consequently, kitchen storage space is unable to be efficiently maximized.

Thus, it would be desirable to provide systems and devices for providing efficient storage for containers. It would be further desirable to provide systems and devices that also encourage easy access of culinary containers. It would be yet further desirable to provide systems and devices for storage of culinary containers that are modular, customizable, reliable, and durable, in order to fit any kitchen cabinet size or structure. Such systems and devices incorporating such advantageous features are hereby provided.

SUMMARY

This Summary is provided to introduce a selection of concepts in a simplified form that are further described below in the Detailed Description. This Summary is not intended to identify key features or essential features, nor is it intended to limit the scope of the claims included herewith.

In some aspects, the techniques described herein relate to a container storage device including: a left wall, a right wall, a bottom wall, and a rear wall, wherein the left wall is disposed orthogonal to the rear wall, forming a left-rear juncture, wherein the right wall is disposed orthogonal to the rear wall, forming a right-rear juncture, wherein the rear wall is disposed orthogonal to the bottom wall, forming a rear-bottom juncture, wherein the left wall is disposed orthogonal to the bottom wall, forming a left-bottom juncture, and wherein the right wall is disposed orthogonal to the bottom wall, forming a right-bottom juncture; and a divider in contact with the rear wall and the bottom wall, the divider disposed in parallel to the left wall and the right wall; a left pocket bound by at least the left wall, the rear wall, the bottom wall, and the divider; a right pocket bound by at least the right wall, the rear wall, the bottom wall, and the divider; a plurality of fabric components disposed around each of the left wall, the right wall, the bottom wall, the rear wall, and the divider; and one or more magnet wells disposed in each of the left wall and the right wall, the one or more magnet wells sized to accept one or more magnets.

The present disclosure may provide a container storage system comprising at least one storage device comprising a bottom wall; a rear wall attached to the bottom wall; a first wall attached to both the bottom wall and the rear wall; a second wall attached to both the bottom wall and the rear wall; a divider attached to both the bottom wall and the rear wall, the divider disposed between the first wall and the second wall, wherein the divider is shorter and less deep than the first wall, the second wall, and wherein the divider is shorter than the rear wall; a first pocket disposed between the first wall and the divider, the first pocket bound by at least the first wall, the rear wall, the bottom wall, and the divider; a second pocket disposed between the second wall and the divider, the second pocket bound by at least the second wall, the rear wall, the bottom wall, and the divider; one or more magnet wells disposed within the first wall and the second wall; and one or more magnets disposed within the one or more magnet wells of the first wall and the second wall.

In an embodiment, the rear wall, the first wall, and the second wall are orthogonal to the bottom wall. In a further embodiment, the first wall and the second wall are orthogonal to the rear wall.

The at least one storage device may be comprised of a rigid material. As a nonlimiting example, the rigid material is medium-density fiberboard.

In an embodiment, the bottom wall, the rear wall, the first wall, the second wall, and the divider attached to both the bottom wall and the rear wall are at least partially covered in a covering.

As a nonlimiting example, the one or magnets are neodymium magnets.

In an embodiment, the first pocket is defined by a first pocket volume and the second pocket is defined by a second pocket volume, wherein the first pocket volume is equal to the second pocket volume.

PARTS LIST 100 storage device
102 left wall
104 right wall
106 rear wall
108 bottom wall
110 divider
112 left pocket
114 right pocket
116 left bullnose
118 divider bullnose
120 right bullnose
122 inner surface
124 outer surface
126 left-rear juncture
128 right-rear juncture
130 left-bottom juncture
132 right-bottom juncture
134 rear-bottom juncture
136 one or more magnets
138 magnet well

BRIEF DESCRIPTION OF THE DRAWINGS

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

FIG. 15 is an illustration of an embodiment of three storage devices, in a reversibly conjoined state, each retaining one or more culinary containers.

DETAILED DESCRIPTION

Figure 1:
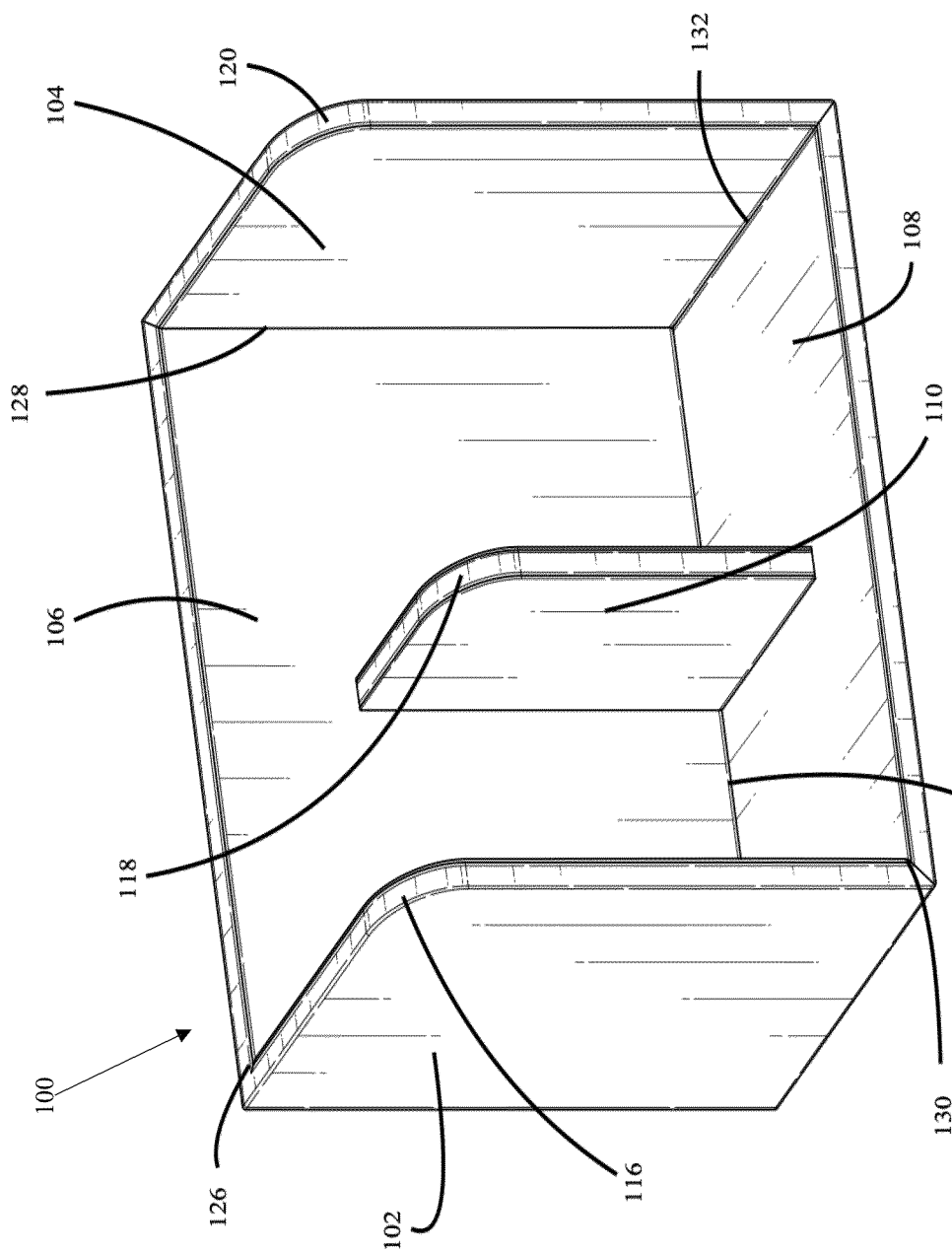
FIG. 1 is a top front left side perspective view of an embodiment of a container storage device.
Figure 2:
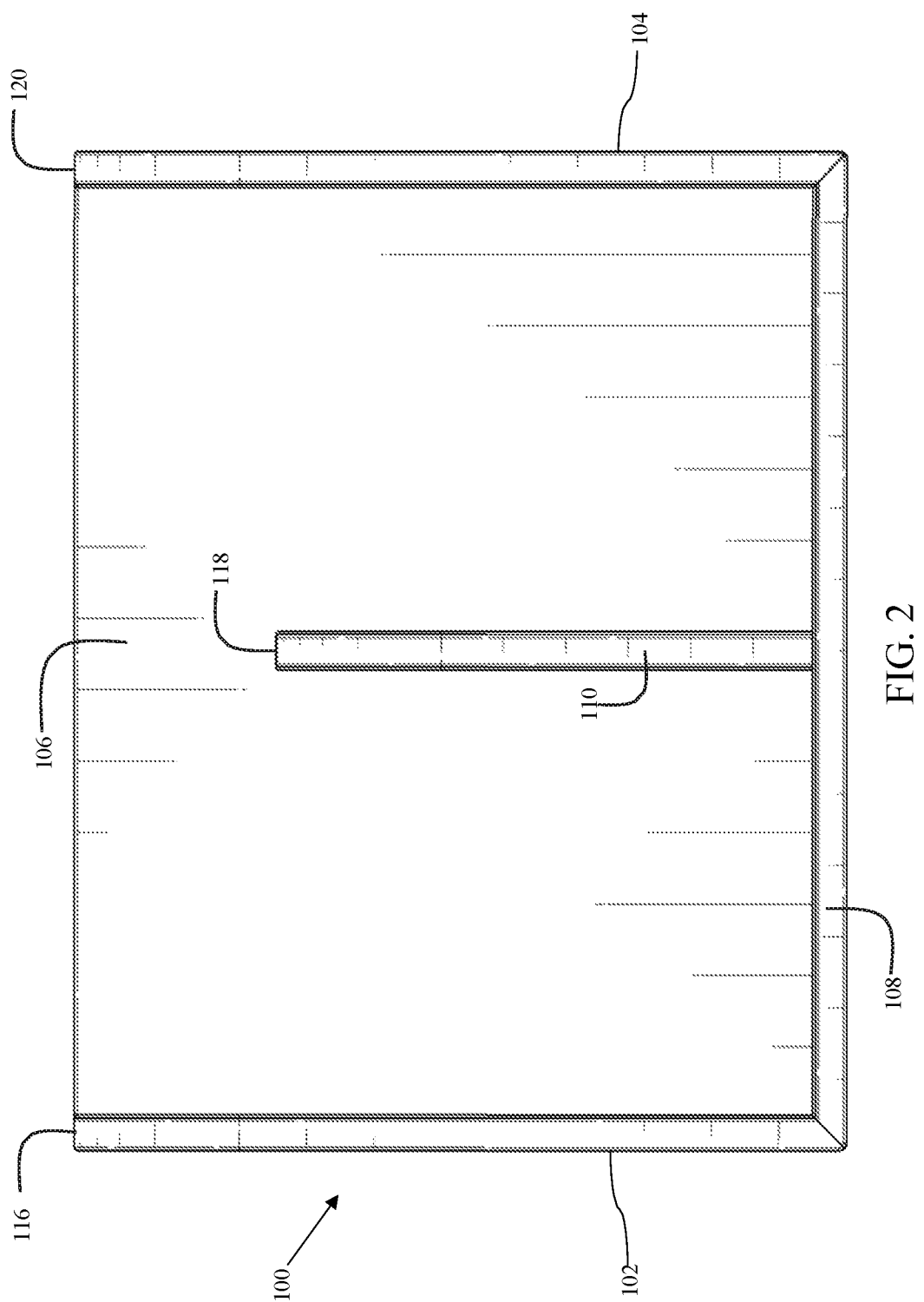
FIG. 2 is a front view of an embodiment of a container storage device.
Figure 3:
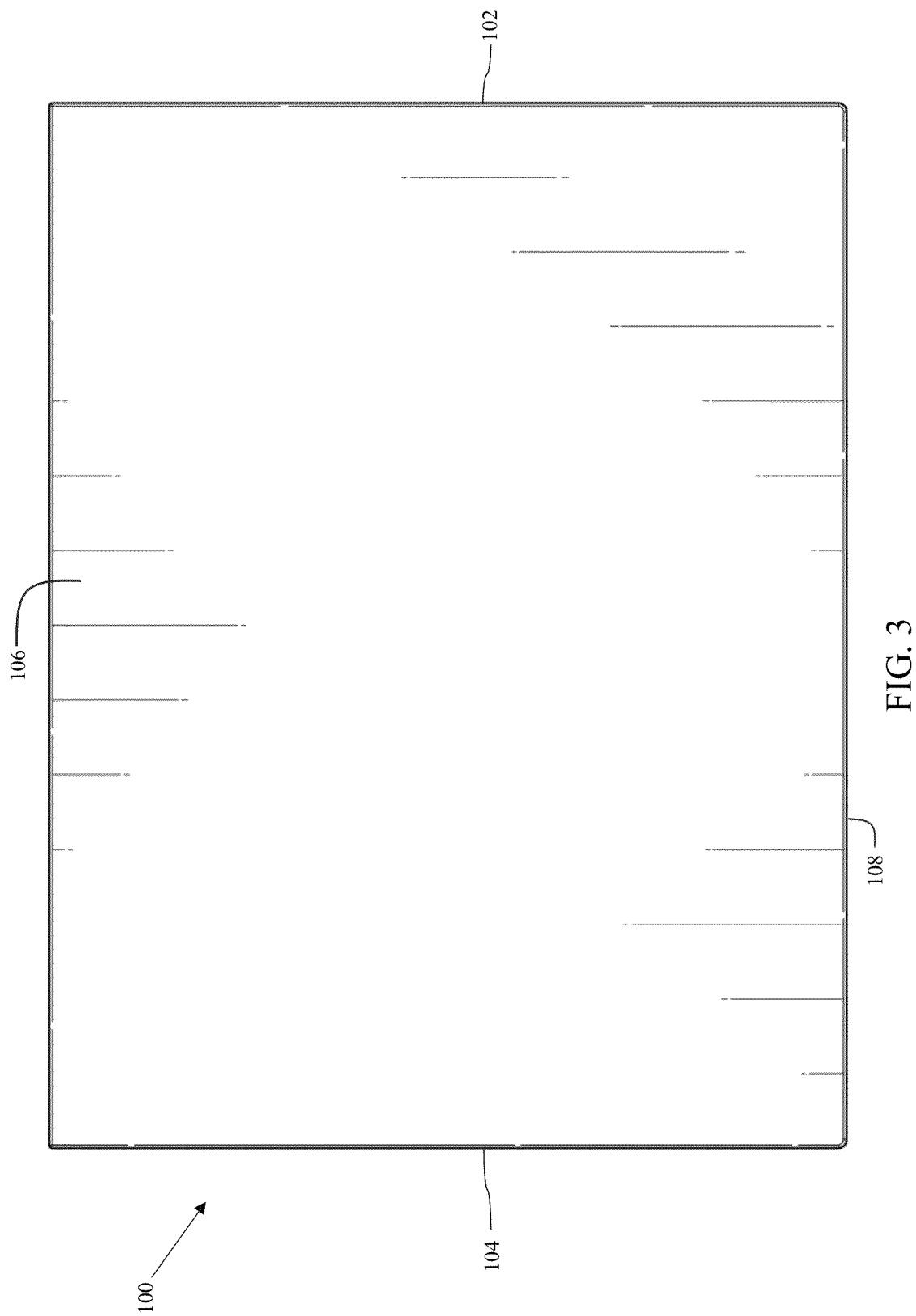
FIG. 3 is a rear view of an embodiment of a container storage device.
Figure 4:
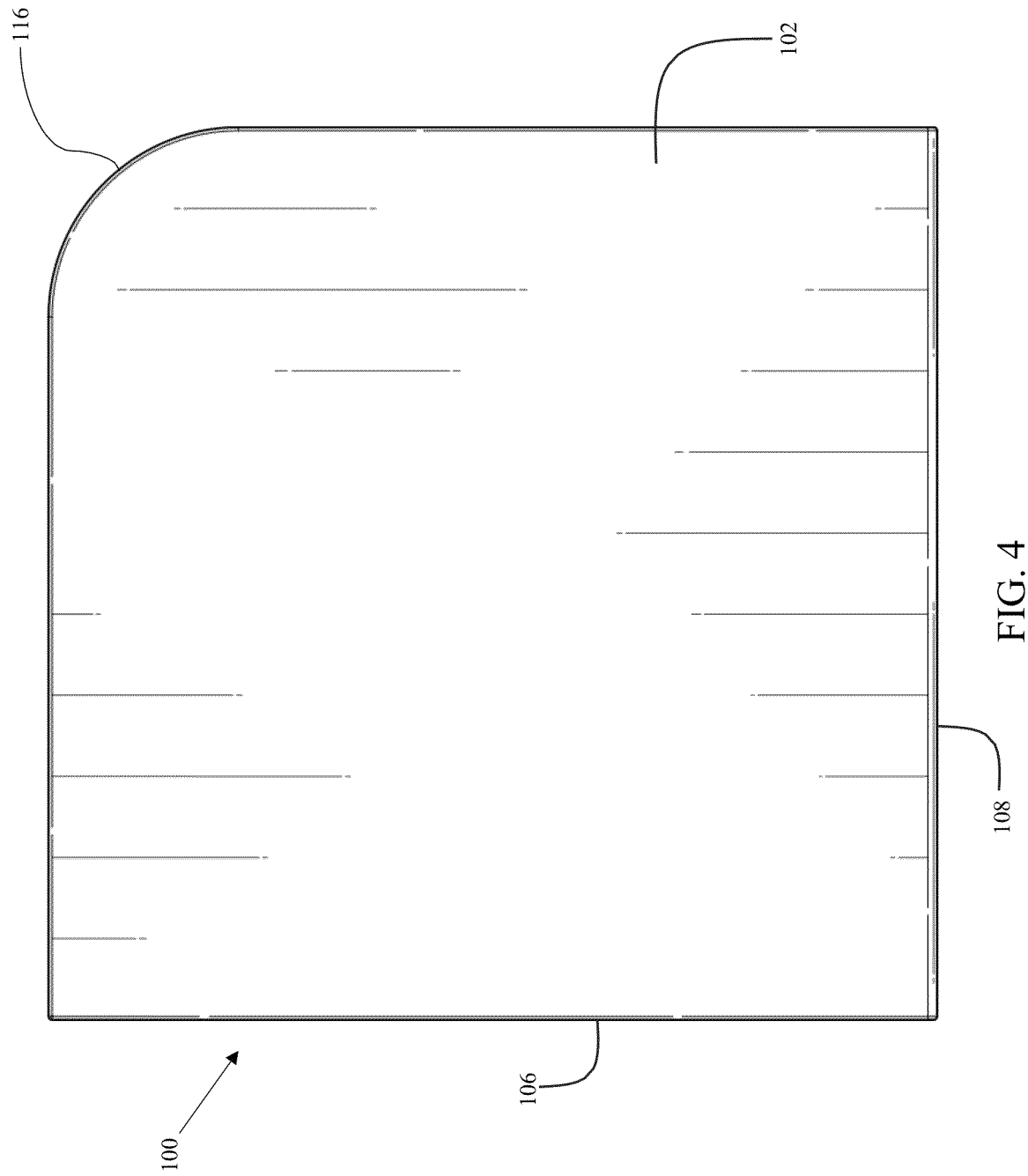
FIG. 4 is a left side view of an embodiment of a container storage device.
Figure 5:
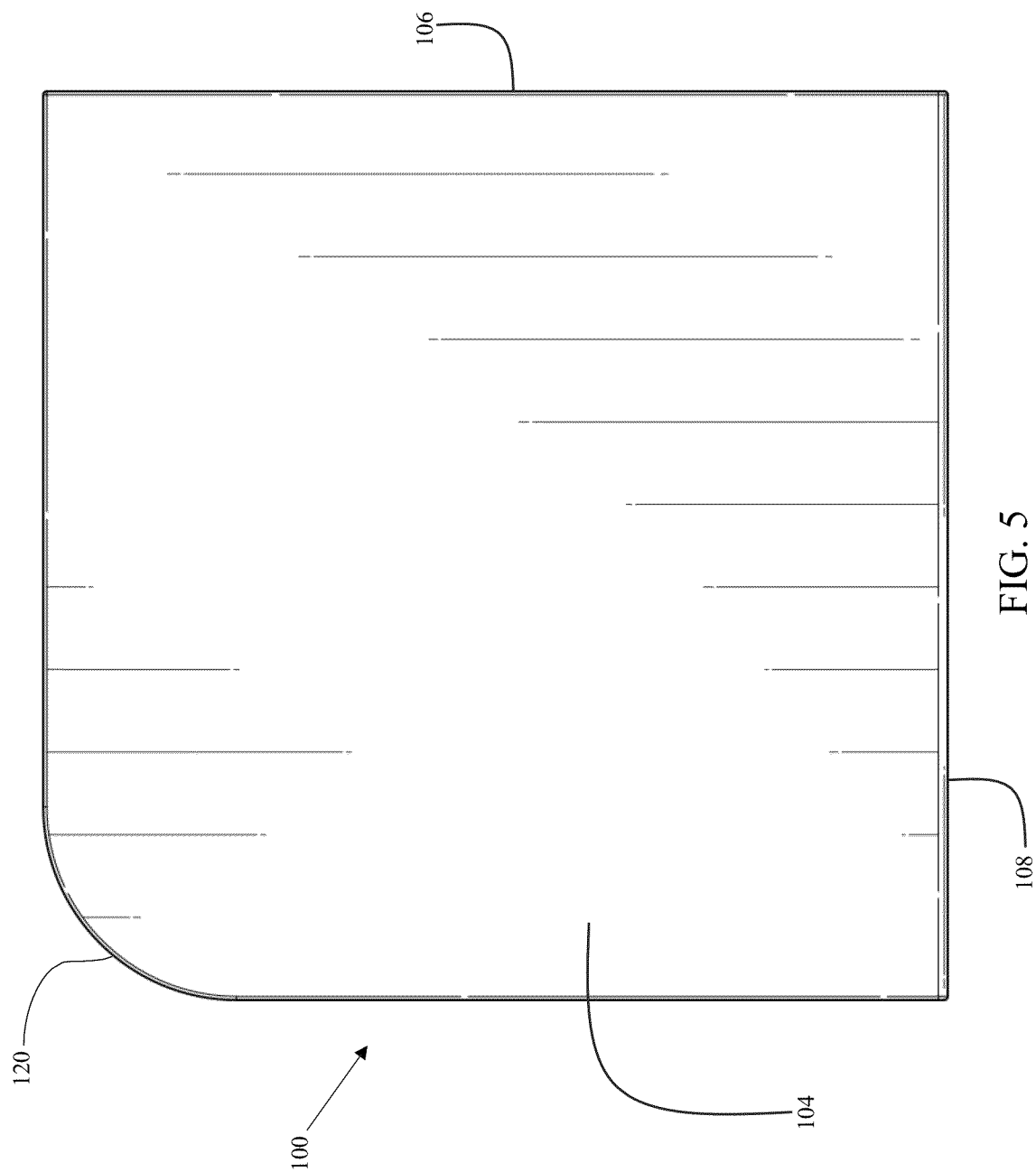
FIG. 5 is a right side view of an embodiment of a container storage device.
Figure 6:
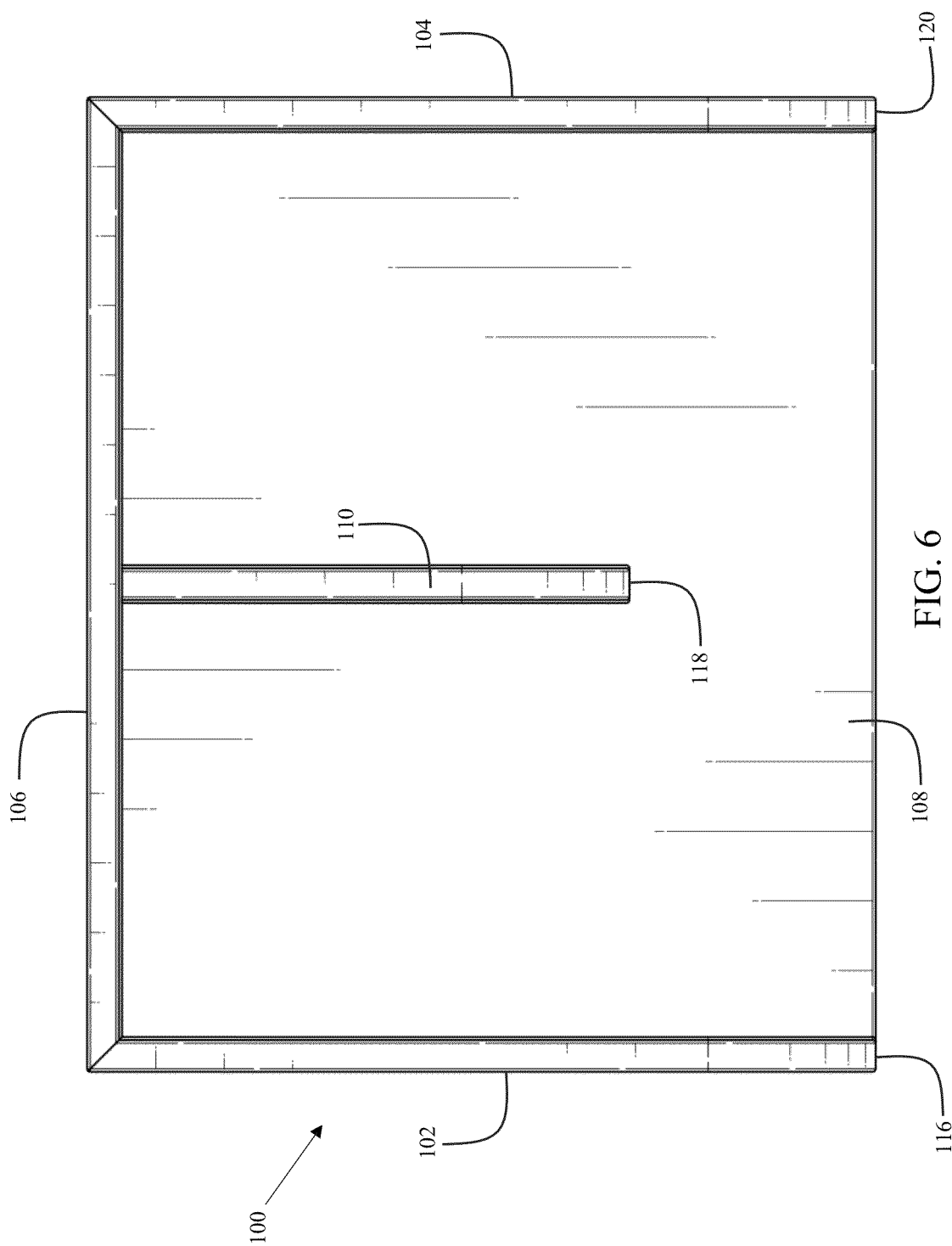
FIG. 6 is a top view of an embodiment of a container storage device.
Figure 7:
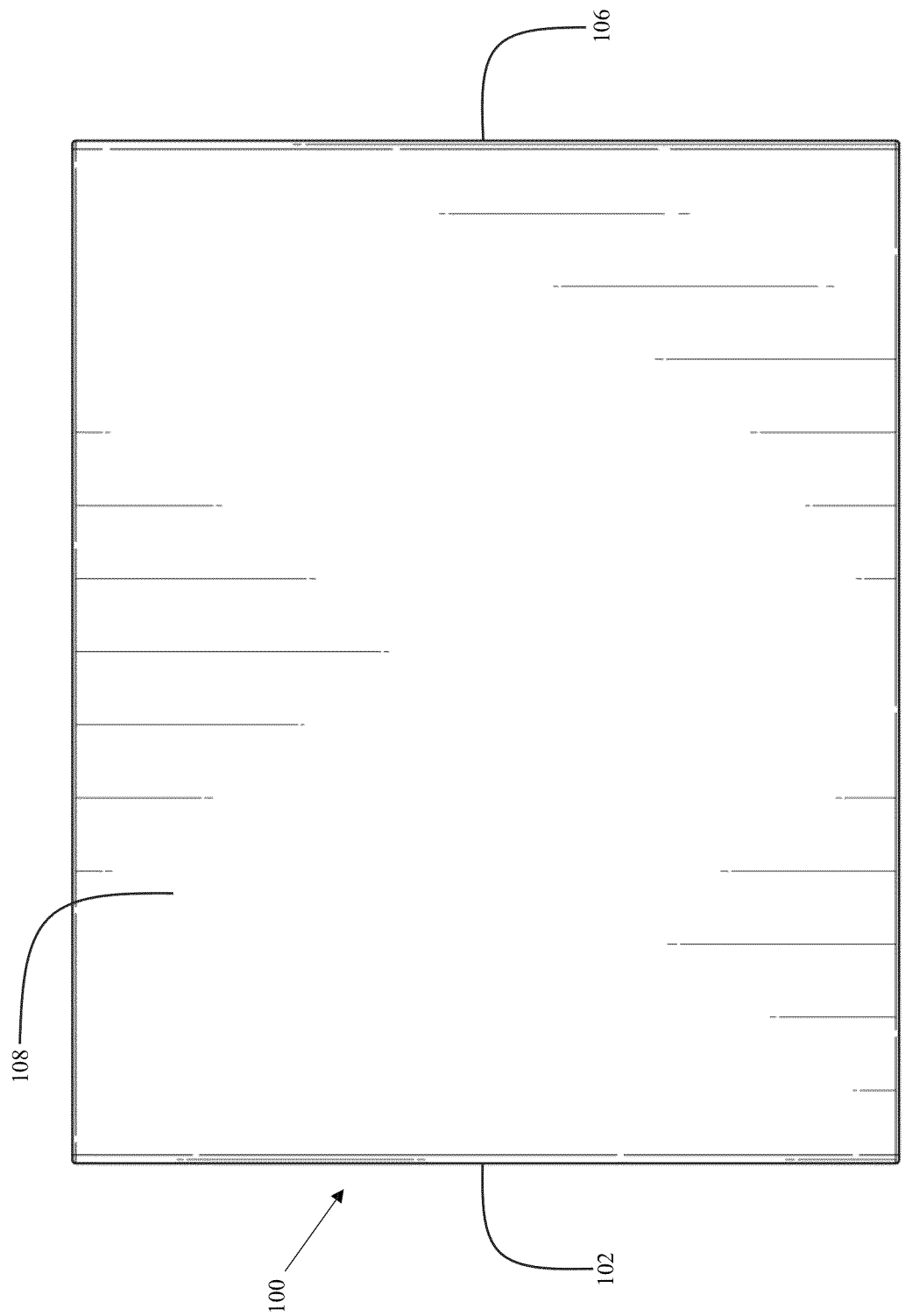
FIG. 7 is a bottom view of an embodiment of a container storage device.
Figure 8:
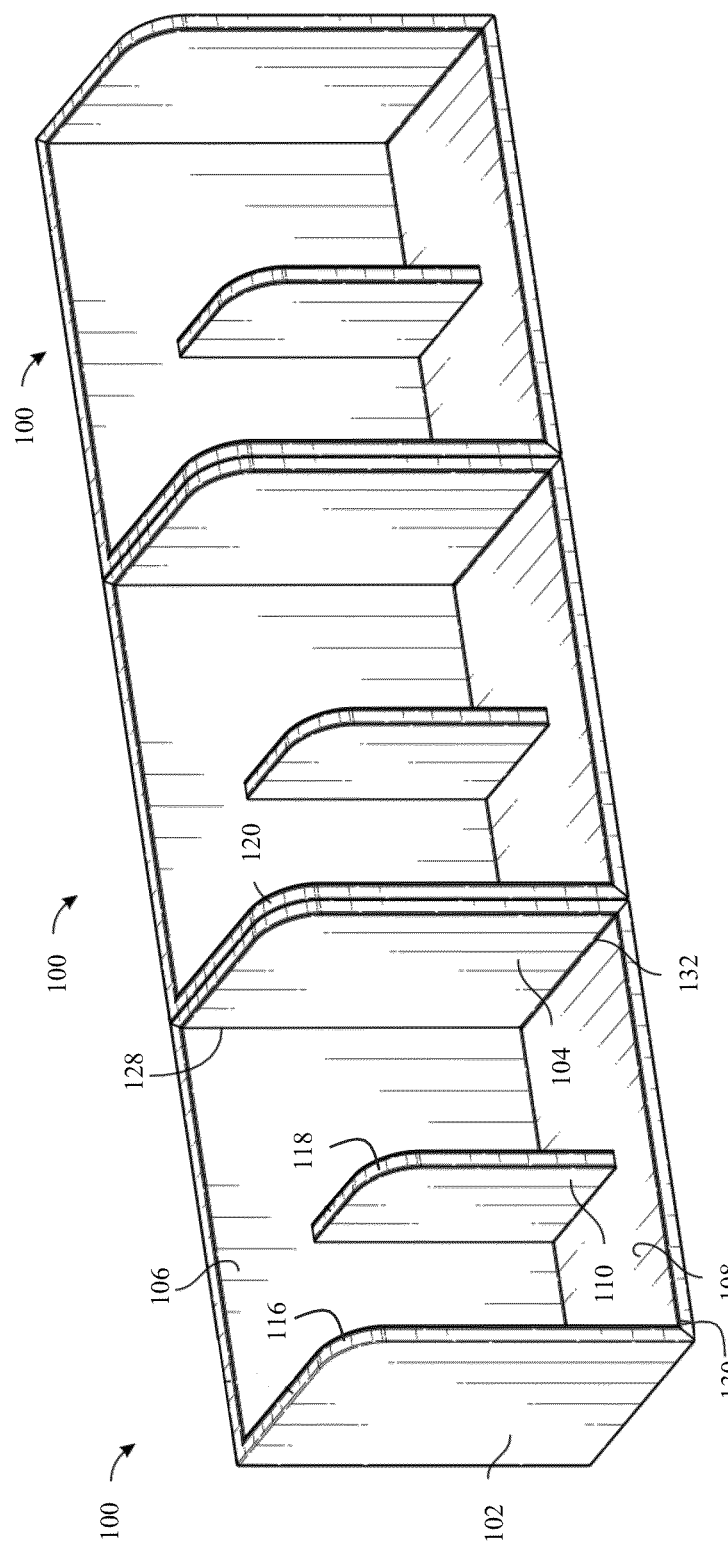
FIG. 8 is a top front left side perspective view of three container storage devices side-by-side.
Figure 9:
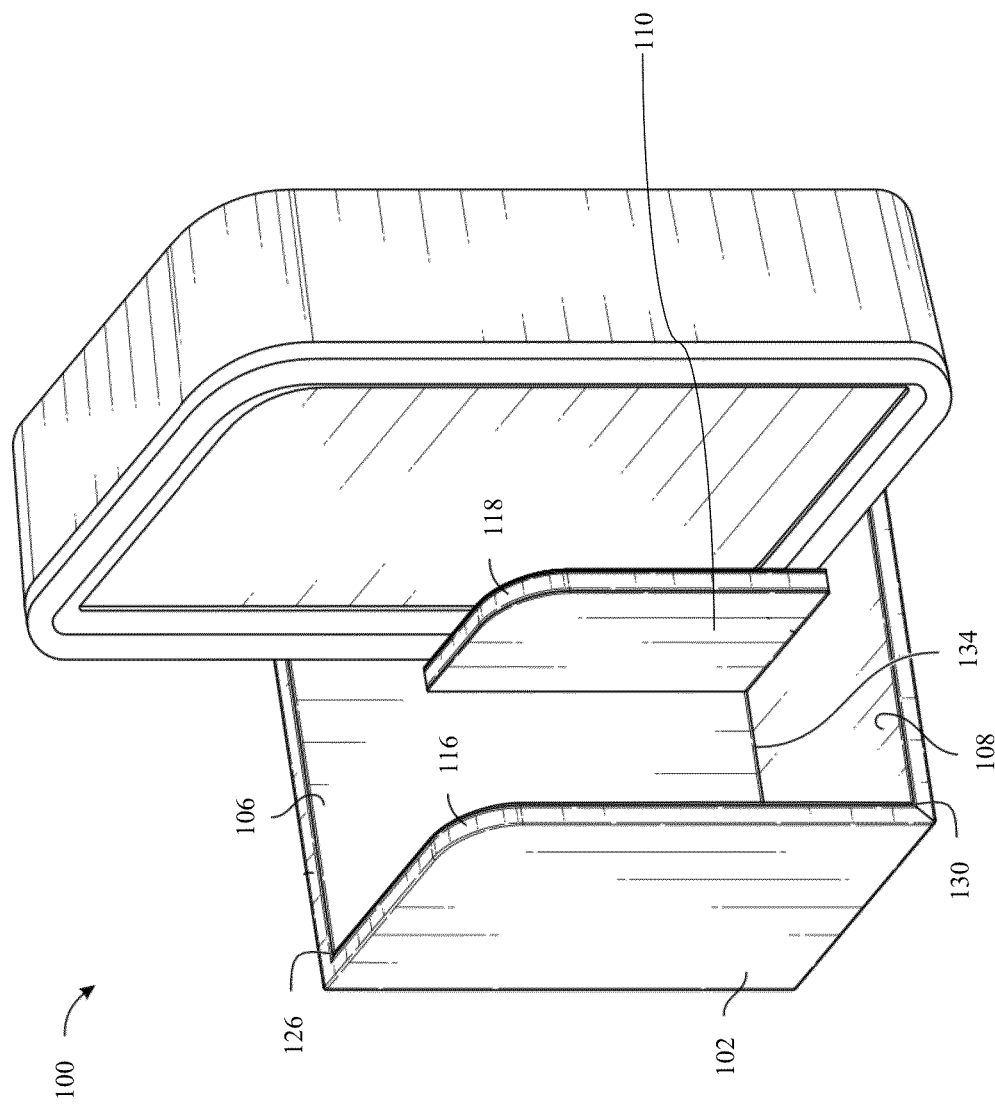
FIG. 9 is a top front left side perspective view of an embodiment of a container storage device retaining a container.

In the following detailed description, reference will be made to the accompanying drawing(s), in which identical functional elements are designated with like numerals. The aforementioned accompanying drawings show by way of illustration, and not by way of limitation, specific aspects, and implementations consistent with principles of this disclosure. These implementations are described in sufficient detail to enable those skilled in the art to practice the disclosure and it is to be understood that other implementations may be utilized and that structural changes and/or substitutions of various elements may be made without departing from the scope and spirit of this disclosure. The following detailed description is, therefore, not to be construed in a limited sense.

It is noted that the description herein is not intended as an extensive overview, and as such, concepts may be simplified in the interests of clarity and brevity.

All documents mentioned in this application are hereby incorporated by reference in their entirety. Any process described in this application may be performed in any order and may omit any of the steps in the process. Processes may also be combined with other processes or steps of other processes.

Aspects of the present disclosure may include a storage device 100. The storage device 100 may comprise a left wall 102, a right wall 104, a rear wall 106, a bottom wall 108, and/or a divider 110. The left wall 102, the right wall 104, and/or the rear wall 106 may be disposed orthogonally to the bottom wall 108. In an embodiment, the storage device may be covered in a covering. In another embodiment, the left wall 102, the right wall 104, and/or the rear wall 106 may not be disposed orthogonally to the bottom wall 108. Further, the left wall 102 and the right wall 104 may be disposed in parallel to one another. Yet further, the left wall 102 and the right wall 104 may be disposed orthogonally to the rear wall 106. Similarly, the divider 110 may be disposed in parallel to the left wall 102 and the right wall 104. In an embodiment, the divider 110 may be disposed orthogonally to the rear wall 106 and/or bottom wall 108.

Turning to FIGS. 1-9, in an embodiment, a distal end of the right wall 104 and a distal end of the left wall 102 may attach to a first side of the rear wall 106 and/or a second side of the rear wall 106. The right wall 104 and the left wall 102 may include rounded edges or corners (described herein as left bullnose 116 and right bullnose 120). In another embodiment, the right wall 104 and the left wall 102 may include angular edges or corners (i.e., right-angles). As a nonlimiting example, the left bullnose 116 and/or the right bullnose 120 may be rounded. In such a nonlimiting example, the rounded edges of the left bullnose 116 and/or the right bullnose 120 may enable unobstructed placement and withdrawal of containers within the storage device 100. Accordingly, said bullnoses 116/120 may be less jagged and, thus, less likely to cause snags (as opposed to a sharp ninety-degree corner) when depositing containers within the storage device 100.

In an embodiment, the left wall 102 and the rear wall 106 meet perpendicularly to form a left-rear juncture 126. In an alternative embodiment, the left wall 102 and the rear wall 106 do not meet perpendicularly. In a further embodiment, the right wall 104 and the rear wall 106 meet perpendicularly to form a right-rear juncture 128. In another embodiment, the right wall 104 and the rear wall 106 do not meet perpendicularly. The left-rear juncture 126 and right-rear juncture 128 may fasten the rear wall 106 to the left wall 102 and/or the right wall 104. In a further embodiment, the left wall 102 and the bottom wall 108 may meet to form a left-bottom juncture 130. In such an embodiment, the left wall 102 and the bottom wall 108 may meet perpendicularly. In an embodiment, the right wall 104 and the bottom wall 108 may meet to form a right-bottom juncture 132. In such an embodiment, the right wall 104 and the bottom wall 108 may meet perpendicularly. The left-bottom juncture 130 and the right-bottom juncture 132 may meet to fasten the bottom wall 108 to the left wall 102 and/or the right wall 104. The left-rear juncture 126, the right-rear juncture 128, the left-bottom juncture 130, and the right-bottom juncture 132 (collectively, the "junctures"), as formed by the left wall 102, the right wall 104, and the rear wall 106 (collectively, the "walls"), may provide rigid support to the storage device 100. In yet a further embodiment, the rear wall 106 and the bottom wall 108 may meet perpendicularly to form a rear-bottom juncture 134.

In an embodiment, the divider 110 is disposed on the rear wall 106 and/or the bottom wall 108. In a further embodiment, the divider 110 may be positioned equidistant from the left wall 102 and/or the right wall 104. In another embodiment, the divider 110 may be shorter than the rear wall 106, the left wall 102, and/or the right wall 104. As a nonlimiting example, the divider 110 may be roughly 70% the height of the rear wall 106, the left wall 102, and/or the right wall 104. However, the divider 110 may be any height equal to or less than the walls. Further, the divider 110 may be roughly 70% the depth of the left wall 102 and/or the right wall 104. However, the divider 110 may be any depth equal to or less than the walls. The divider 110 may be sized and adapted to partition the storage device 100 (for example, to provide structure for retention of containers), yet may be unobtrusive enough as to enable withdrawal and deposit of containers within the storage device 100.

A left pocket 112 may be formed between the left wall 102 and the divider 110. A right pocket 114 may be formed between the divider 110 and the right wall 104. Volumetrically, if the divider 110 is disposed at the midpoint of the rear wall 106, the left pocket 112 and the right pocket 114 may comprise the same volumes. However, the volumes of the left pocket 112, and the right pocket 114, may be adjusted as a function of the position of the divider 110. The storage device 100 may have a total volume comprising at least the left pocket volume and the right pocket volume.

In one embodiment, the left wall height may be equal to the left wall depth and/or the right wall height may be equal to the right wall depth. Thus, with the exception of the bullnoses 114/118, the left wall 102 and the right wall 104 may be generally square. However, in alternate embodiments the left wall 102 and the right wall 104 may be any suitable dimensions.

Figure 10:
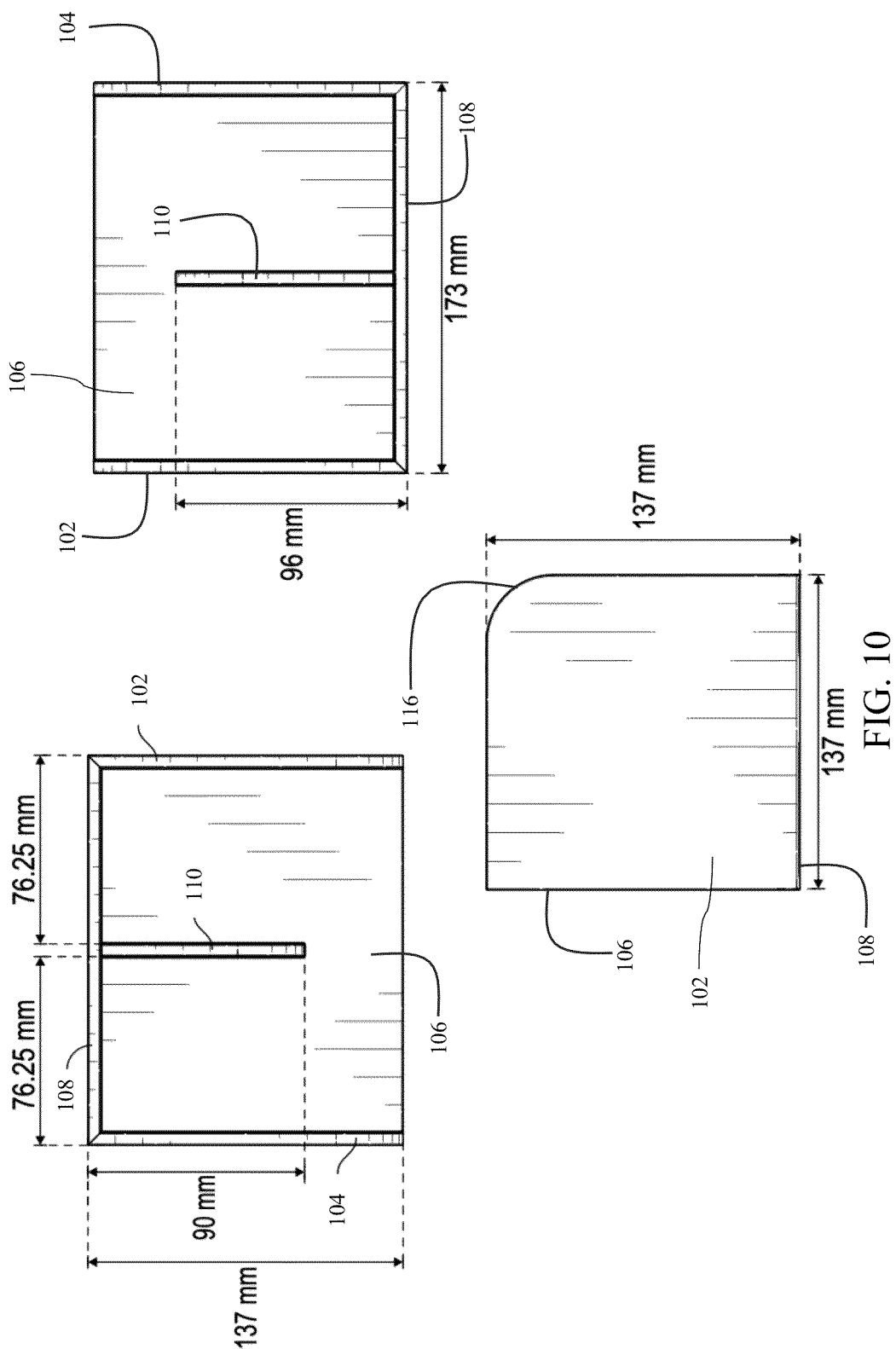
FIG. 10 is an illustration depicting exemplary dimensions of an embodiment of the container storage device components.

Referring to FIG. 10, in an embodiment, the storage device 100 may be 173 mm wide, 137 mm deep, and/or 137 mm tall. In a further embodiment, the left wall 102 and/or the right wall 104 may be 137 mm tall and/or 137 mm deep. In yet a further embodiment, the divider 110 may be 90 mm deep and/or 96 mm tall. In another embodiment, the left wall 102 and/or the right wall 104 may be 5.75 mm thick. In an alternative embodiment, the divider 110 may be 9 mm thick. However, the left wall 102, the right wall 104, and the divider 110, of the storage device 100, may be any suitable dimensions.

Figure 11:
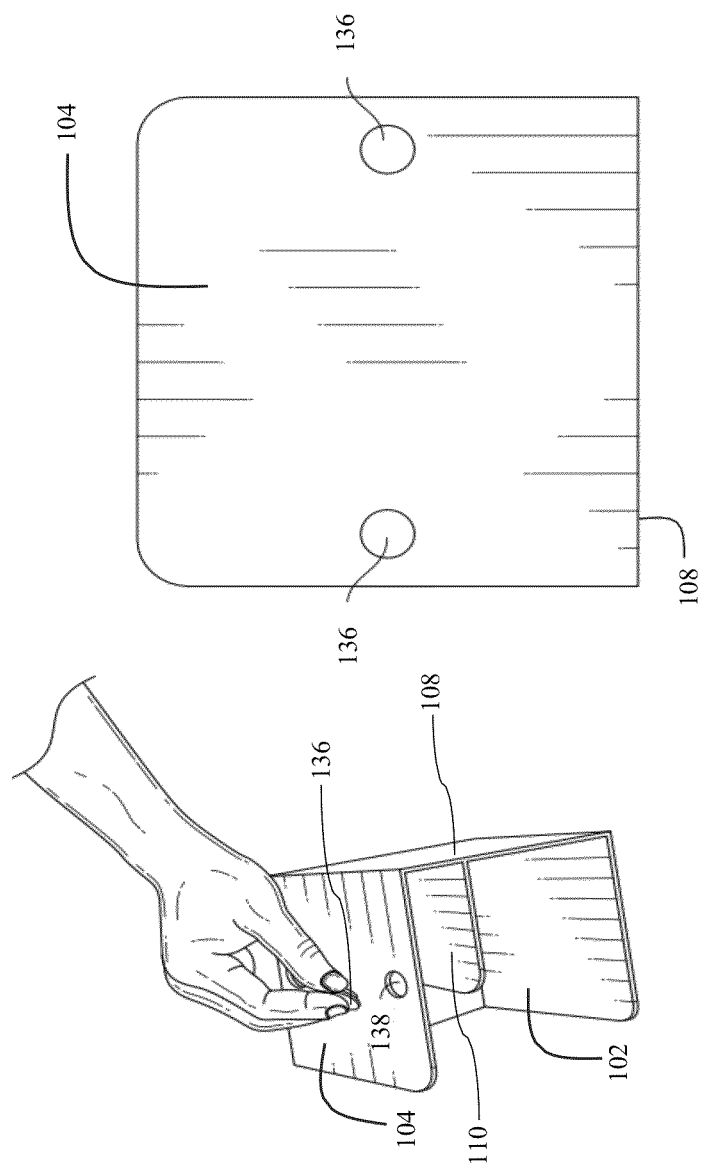
FIGS. 11A-11B depict utilization of magnets in an embodiment of the storage device.

The storage device 100 may further include one or more magnets 136. In an embodiment, the one or more magnets 136 may be embedded in the left wall 102 and/or the right wall 104, such that said magnets 136 may be in line with a plane of the left wall 102 and/or the right wall 104. As shown in FIGS. 11A-11B, the one or more magnets 136 may be deposited within one or more magnet wells 138. In an embodiment, the one or more magnet wells 138 are sized to accept the one or more magnets 136. Further, the one or more magnets 136 may be flush with the one or magnet wells 138. In such an embodiment, the one or more magnets 136 may be concealed by the covering (i.e., a fabric disposed over the one or more magnets 136 and the one or more magnet wells 138). In an embodiment, a single magnet may be used. In an alternative embodiment, two or more magnets may be used. In either of the aforementioned embodiments, the one or more magnets 136 of a first storage device 100 may magnetically affix to a second storage device 100. The one or more magnets 136 may be circular in shape to allow for seamlessness within the magnet well 138. However, the one or more magnets may be any suitable shape. In an embodiment, the one or more magnets 136 may be a neodymium magnet (for example, a N38 or N52 neodymium magnet). In an embodiment, the one or more magnets 136 may be multi-pole or polymagnets, for example, to enable increased available storage device 100 orientations because such magnets may not require a specific orientation to adhere. In a further embodiment, the one or more magnets 136 may have any strength suitable for storing containers and conjoining storage devices 100. In an embodiment, magnetic coupling may be achieved by placing a left wall 102 and/or right wall 104 of a first storage device 100 in close proximity to a left wall 102 and/or right wall 104 of a second storage device 100. Accordingly, the magnetic attraction between the two devices 100 may allow the two devices 100 to reversibly couple. In an alternate embodiment, the left wall 102 and/or the right wall 104 may include a metallic element configured to induce magnetic coupling between the metallic element and the one or more magnets 136. In an embodiment, the left wall 102 and/or the right wall 104 containing the one or more magnets 136 may be sufficiently thick, such that the one or more magnets 136 are further distanced from potentially metallic containers stored within the storage device 100. Such an embodiment may reduce unintentional magnetic adherence of a container to the left wall 102 and/or the right wall 104.

In an alternate embodiment, one or more storage devices 100 may be coupled via a hook-and-loop fastener, an adhesive, a button(s), a latch, a locking hinge, or other fastener. In such an embodiment, these alternate fasteners may supplement the one or more magnets 136 or may replace said magnets 136.

In an embodiment, the storage device 100 may include any number of dividers. Further, the dividers may be positioned in any fashion. In an alternate embodiment, any number of the dividers may be positioned at least one of orthogonally, parallelly, and angled to the left wall 102 and/or the right wall 104. In an embodiment, the dividers may be of a thickness that is equivalent to a thickness of the left wall 102 and/or the right wall 104. Alternatively, the dividers may be of a thickness that is at least one of greater than and less than the left wall 102 and/or the right wall 104. Further, the dividers may be at least one of transparent and opaque.

In an embodiment, the storage device 100 may be comprised of a rigid material. Said rigid material may include, but is not limited to, plastic, wood, cardboard, and/or Medium-Density Fiberboard ("MDF"). In an embodiment, the storage device 100 or components of the storage device 100 may include the covering. The covering may be utilized to prevent culinary containers from slipping from and/or scratching adjacent culinary containers. As a nonlimiting example, MDF may be used to construct the storage device 100, enabling a rigid structure capable of accepting the covering seamlessly. In yet a further embodiment, the storage device 100 may be comprised of a non-slip bottom. In such an embodiment, the non-slip bottom may prevent the storage device 100 from slipping while atop a supporting surface. In an alternative embodiment, the non-slip bottom may be disposed upon a bottom surface of the bottom wall 108.

Figure 12:
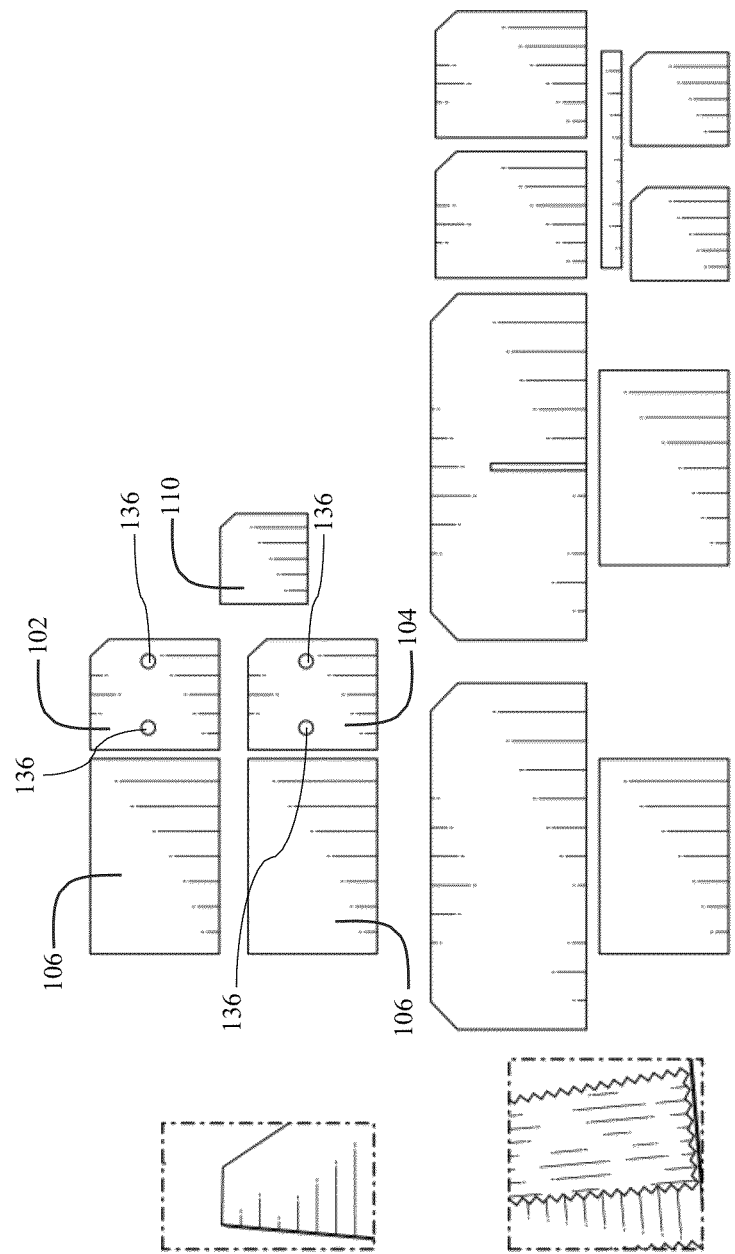
FIG. 12 is an illustration of the wood and fabric components of an embodiment of the storage device.

Referring to FIG. 12, the storage device 100 may be composed of a plurality of rigid components (shown above) and a plurality of corresponding covering pieces (shown below), wherein the plurality of rigid components may be comprised of the rigid material. In an embodiment, the plurality of corresponding covering pieces may be sized to cover at least one of the plurality of rigid components. However, at least one of the plurality of corresponding covering pieces may be sized to the plurality of rigid components. In an embodiment, one or more of the plurality of covering pieces may include cut-outs (i.e., sized to accept a divider). In an embodiment, a logo may be printed on at least one of the plurality of corresponding covering pieces, which may cover the left wall 102, the right wall 104, the rear wall 106, and/or the bottom wall 108. In a further embodiment, one or more magnets 136 may be positioned on the left wall 102 and/or the right wall 104. As a nonlimiting example, the one or more magnets 136 may be captured between the rigid material and the covering disposed atop the rigid material. Further, the one or more magnets 136 may be coupled to the corresponding one or more magnet wells 138 via an adhesive.

In an alternate embodiment, the one or more magnets 136 may be coupled to the corresponding one or more magnet wells 138 via a hook and loop fastener. The plurality of corresponding covering pieces may be fastened to the plurality of rigid components via an adhesive. Each rigid component may have a corresponding covering piece. As a nonlimiting example, glue may be applied to an outer perimeter of the plurality of corresponding covering pieces, such that said perimeter may be wrapped around at least one of the plurality of rigid components. Such method of assembly enables the covering pieces to be applied after assembly of the rigid components. In an embodiment, provisions of the plurality of rigid components and the plurality of corresponding covering pieces, as shown in FIG. 12, may permit the storage device 100 to maintain the structure described herein. Each of the storage device 100 components (the left wall 102, the right wall 104, the rear wall 106, the bottom wall 108, and/or the divider 110) may be equipped with one or more covering pieces. The covering pieces may include an overlap when assembled. Such covering pieces and overlap may increase the storage device's 100 water resistance, which is particularly effective for storing containers which have just been washed.

In an embodiment, the covering is waterproof (for example, to promote integrity of the storage device 100 when wet container items are deposited within or adjacent to the storage device 100). In a further embodiment, the covering may be textured (for example, to promote friction such the containers do not move excessively within the storage device 100). The covering may be at least one of 720D cotton/linen fabric, 1MM, waterproof, and 200-210 gsm. In another embodiment, the covering may accommodate a weave pattern for texture. However, the covering may be comprised of any suitable textile alternative. In one embodiment, the covering may be treated with a spray finish, for example, a clear coat finish. Such a spray finish may increase the integrity of the storage device 100 both structurally and aesthetically (for example, preventing stains or providing a surface that is easier to clean).

The storage device 100 may be configured in a plurality of sizes. In an embodiment, the plurality of sizes may be able to accommodate small and/or large bundles of culinary containers. In a further embodiment, the storage device 100 may be sized to fit any combination and/or quantity of a small culinary container with or without a lid, a medium culinary container with or without a lid, a large culinary container with or without a lid, a dot ramekin/insert with or without a lid, and/or a dash ramekin/insert with or without a lid. However, the storage device may be configured to store any suitable culinary storage device alternative.

Figure 13:
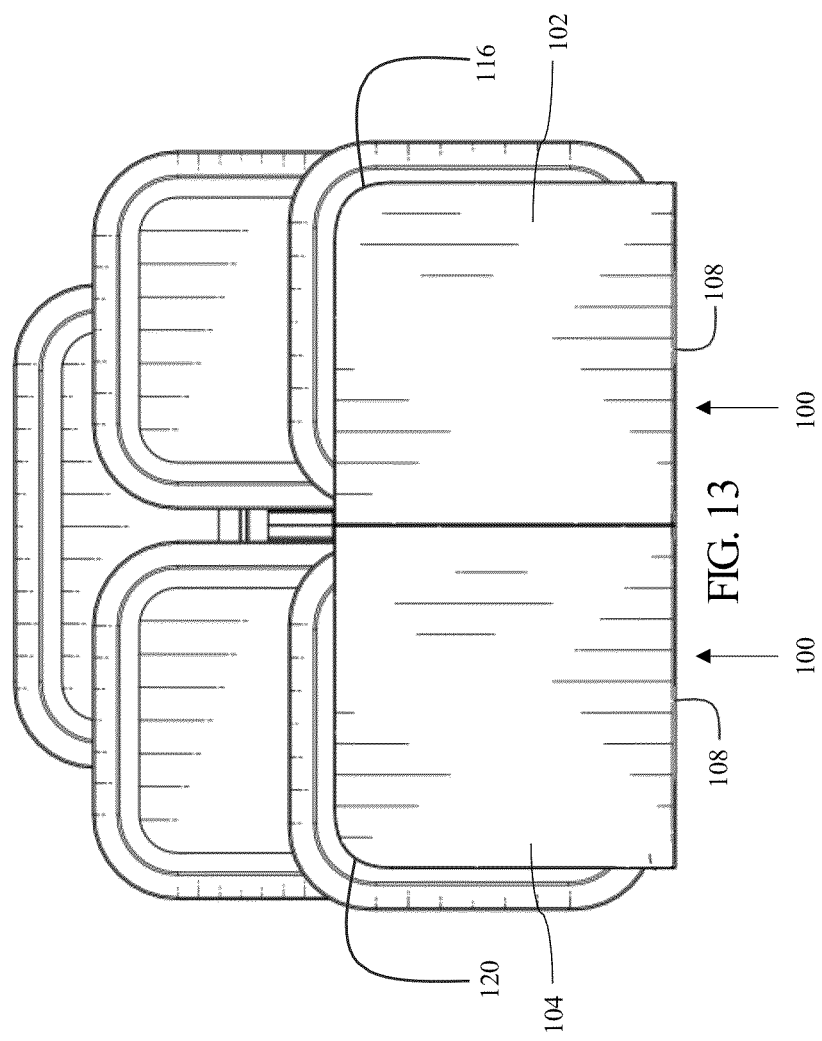
FIG. 13 is an illustration of and embodiment of three storage devices in a reversibly conjoined state.

Referring to FIG. 13, a plurality of storage devices may be conjoined. As a nonlimiting example, the rear wall of a first storage device may interface with the rear wall of a second storage device and/or the rear wall of a third storage device may interface with the left wall of the first storage device and the right wall of the second storage device. In some embodiments, one or more magnets 136 may be disposed in the rear wall 106, such that the rear wall 106 of a storage device 100 may reversibly couple with the left wall 102 and/or a wall of another storage device. In effect, any number of storage devices may be conjoined in any suitable manner.

In an embodiment, the magnet wells 138 may be positioned in the left wall 102 and/or the right wall 104 of the first storage device such that adjacent walls of other storage devices may magnetically couple to the first storage device regardless of orientation. As a further nonlimiting example, the magnet wells 138 may be positioned such that the left wall and/or right wall of the first storage device may magnetically couple to a left wall of the second storage device and/or a right wall 104 of the second storage device.

In one embodiment, the divider 110 may adhere to the rear wall 106 and/or the bottom wall 108 prior to application of the covering. Accordingly, the divider 110 may be securely affixed as a function of both an adhesive between the divider 110 and the rear wall 106 and/or the bottom wall 108, and/or the tension and support provided by the covering. In an embodiment, the plurality of corresponding covering pieces may be sized slightly larger than the surface area of an outer face of at least one of the left wall 102, the right wall 104, the rear wall 106, and the bottom wall 108 such that the outer perimeter may wrap around the left wall 102, the right wall 104, the rear wall 106, and/or the bottom wall 108. In such an embodiment, said covering may partially cover the inner surfaces of the left wall 102, the right wall 104, the rear wall 106, and/or the bottom wall 108. Accordingly, one or more segments of the plurality of corresponding covering pieces may be applied to the inner surfaces of the left wall 102, the right wall 104, the rear wall 106, and/or the bottom wall 108 to conceal the outer perimeters of said covering pieces.

Figure 14:
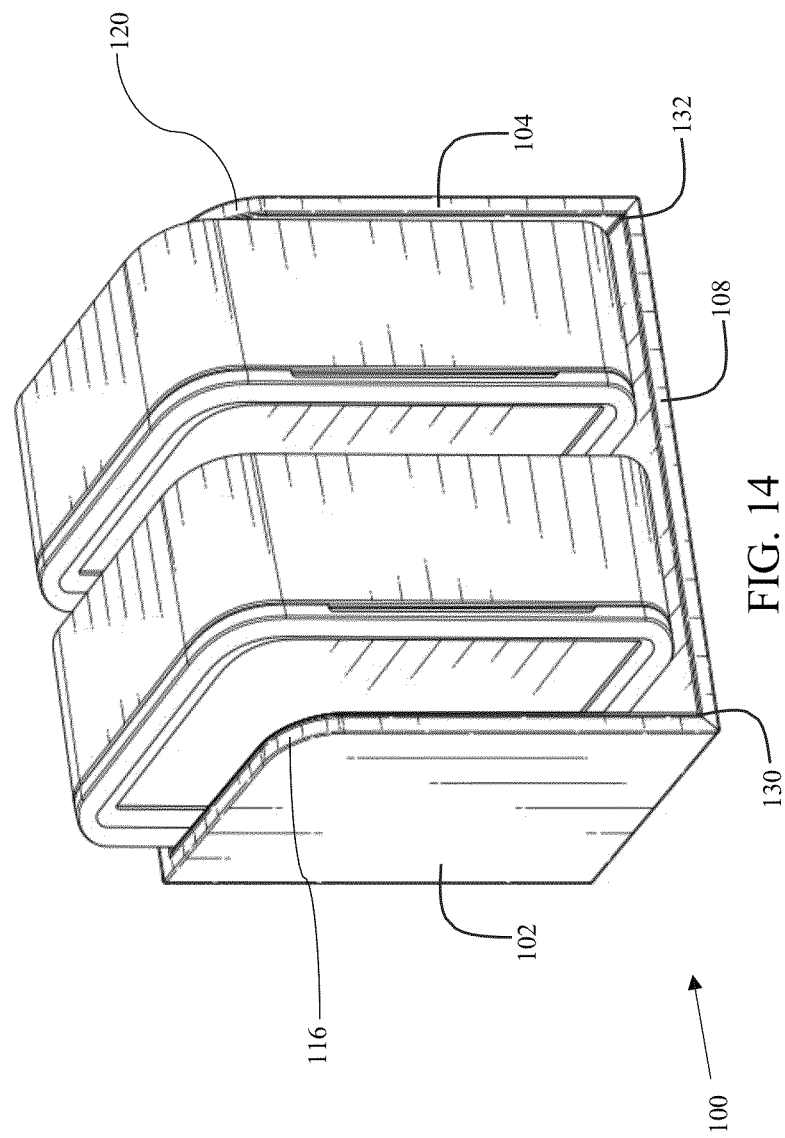
FIG. 14 is an illustration of an embodiment of the storage device retaining two culinary containers.

FIG. 14 is an illustration of an embodiment of the storage device retaining two culinary containers. The storage device 100 may be configured to retain two equally sized culinary containers. As a nonlimiting example, one of each culinary container may be deposited into the left pocket 112 and/or the right pocket 114. Yet further, the storage device 100 may be sized to accommodate culinary containers disposed in an upright position (i.e., the one or more culinary containers may stand upon their sidewall). However, the left pocket 112 and/or the right pocket 114 may be sized to accept a culinary container of any suitable dimensions in any suitable orientation.

FIG. 15 is an illustration of an embodiment of three storage devices, in a reversibly conjoined state, each storage device 100 retaining one or more culinary containers. As shown in FIG. 15, a variety of culinary containers may be retained by the storage device 100. In another embodiment a plurality of storage devices may be conjoined. In an embodiment, a plurality of storage devices 100 (e.g., three) may be conjoined and utilized to create a storage system for a mixed-container set. In another embodiment, the heights of the culinary containers may be equal such that each of the culinary containers may be inserted on their sides into at least one of the left pocket 112 and the right pocket 114. In a further embodiment, the distance between the left wall 102 and the divider 110 and the distance between the divider 110 and the right wall 104 may be similar to the heights of the various containers. As a nonlimiting example, the widths of the inserts may be similar to the heights of the various containers, and thus, similar to the widths of the left pocket 112 and the right pocket 114. In such a nonlimiting example, the storage device 100 may be configured to receive the inserts in an upright and/or stacked orientation and the various containers in a sideways orientation. All the aforementioned dimensions of each storage device 100, and the quantity of storage devices 100, may be altered to accommodate containers of different quantities and dimensions.

Finally, other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims. Although the storage device 100 is described herein in relation to culinary component storage, the storage device 100 may be used for any suitable purpose. As nonlimiting examples, the storage device 100 may be implemented in an office setting (e.g., to hold papers or files), in a workshop (e.g., to hold tools or building materials), on a bookshelf (e.g., to sort books or other literature), or in any other environment where a user may opt to store components in the pockets manifested by the structure of the storage device 100 described above.

Various elements, which are described herein in the context of one or more embodiments, may be provided separately or in any suitable subcombination. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

All references, patents and patent applications and publications that are cited or referred to in this application are incorporated in their entirety herein by reference. Finally, other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A container storage system comprising:
at least one storage device comprising:
a bottom wall;
a rear wall attached to the bottom wall;
a first wall attached to both the bottom wall and the rear wall;
a second wall attached to both the bottom wall and the rear wall, wherein the first and second walls are orthogonal to the rear wall;
a divider permanently affixed to both the bottom wall and the rear wall, the divider positioned equidistant between the first wall and the second wall,
wherein the divider is shorter and less deep than the first wall, and the second wall,
wherein the divider is shorter than the rear wall, and wherein the divider is rigid;
a first pocket disposed between the first wall and the divider,
the first pocket bound by at least the first wall, the rear wall, the bottom wall, and the divider;
a second pocket disposed between the second wall and the divider,
the second pocket bound by at least the second wall, the rear wall, the bottom wall, and the divider;
one or more magnet wells disposed within the first wall and the second wall;
one or more magnets disposed within the one or more magnet wells of the first wall and the second wall; and
the storage device being at least partially covered in a waterproof fabric covering.

2. The container storage system of claim 1, wherein the rear wall, the first wall, and the second wall are orthogonal to the bottom wall.

3. The container storage system of claim 1, wherein the at least one storage device is comprised of a rigid material.

4. The container storage system of claim 3, wherein the rigid material is medium-density fiberboard.

5. The container storage system of claim 1, wherein the one or magnets are neodymium magnets.

6. The container storage system of claim 1, wherein the first pocket is defined by a first pocket volume and the second pocket is defined by a second pocket volume, wherein the first pocket volume is equal to the second pocket volume.

7. A container storage system comprising:
at least two storage devices, each of the at least two storage devices reversibly attachable, each of the at least two storage devices comprising:
a bottom wall;
a rear wall attached to the bottom wall;
a first wall attached to both the bottom wall and the rear wall;
a second wall attached to both the bottom wall and the rear wall,
wherein the rear wall, the first wall, and the second wall are orthogonal to the bottom wall, wherein the first and second walls are orthogonal to the rear wall;
a divider permanently attached to both the bottom wall and the rear wall, the divider disposed between the first wall and the second wall,
  wherein the divider is shorter and less deep than the first wall, and the second wall,
  wherein the divider is shorter than the rear wall, and wherein the divider is rigid;
a first pocket disposed between the first wall and the divider,
  the first pocket bound by at least the first wall, the rear wall, the bottom wall, and the divider;
a second pocket disposed between the second wall and the divider,
  the second pocket bound by at least the second wall, the rear wall, the bottom wall, and the divider;
one or more magnet wells disposed within the first wall and the second wall;
one or more magnets disposed within the one or more magnet wells of the first wall and the second wall,
  wherein the one or magnets disposed within the first wall of a first of the at least two storage devices reversibly attaches to the one or more magnets disposed within the second wall of a second of the at least two storage devices; and
the at least two storage devices being at least partially covered in a waterproof fabric covering.

8. The container storage system of claim 1, wherein the one or more magnet wells are further disposed within the rear wall.

9. The container storage system of claim 8, wherein the one or magnets are further disposed within the one or more magnet wells of the rear wall.

10. The container storage system of claim 7, wherein the one or more magnet wells are further disposed within the rear wall.

11. The container storage system of claim 10, wherein the one or magnets are further disposed within the one or more magnet wells of the rear wall.

* * * * *